Oct. 16, 1923.
C. A. DISBROW
1,470,822
RENEWABLE INSULATION FOR RAIL JOINTS
Filed Sept. 12, 1922
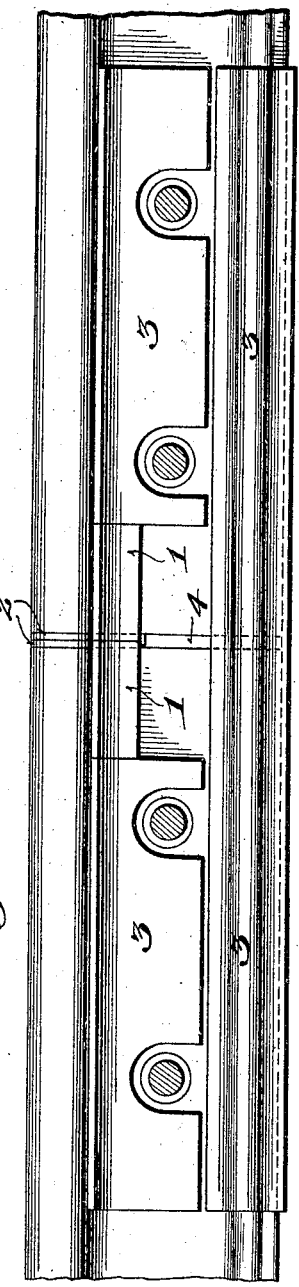
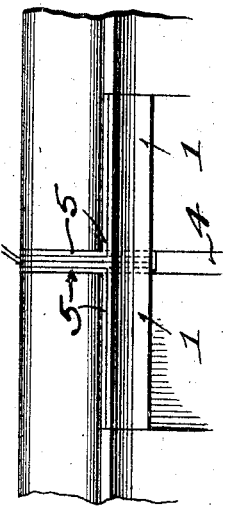
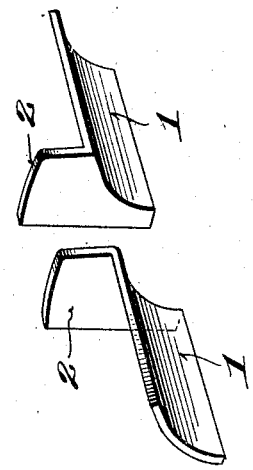
Inventor
Clarkson A. Disbrow,
By
Attorney
WITNESSES:—

Patented Oct. 16, 1923.

1,470,822

UNITED STATES PATENT OFFICE.

CLARKSON A. DISBROW, OF NEW ROCHELLE, NEW YORK, ASSIGNOR TO THE RAIL JOINT COMPANY, OF NEW YORK, N. Y., A CORPORATION OF NEW YORK.

RENEWABLE INSULATION FOR RAIL JOINTS.

Application filed September 12, 1922. Serial No. 587,790.

*To all whom it may concern:*

Be it known that I, CLARKSON A. DISBROW, a citizen of the United States, residing at New Rochelle, in the county of Westchester and State of New York, have invented certain new and useful Improvements in Renewable Insulations for Rail Joints, of which the following is a specification.

This invention relates to that type of sectional insulation for insulated rail joints having readily renewable and replaceable parts, which facilitate the renewal and replacement of worn-out sections of insulation without disturbing good and unworn sections which are still serviceable.

The present invention primarily is intended to meet the requirement of replacing at the same time the worn portion of the head of the insulating end post and the adjacent head sections of insulation under the heads of the rails near the meeting ends thereof. It is now well-known that in an insulated rail joint the fiber insulation material is subjected to the greatest wear and shock under the head of the receiving rail, but at the same time the excessive wear on the insulation is limited to comparatively small areas so that a relatively small amount of insulation need only be replaced from time to time.

Accordingly, means have been provided for renewing the head sections of insulation subjected to the greatest wear, but such means have not contemplated the renewal of the worn head portions of the end post insulation between the meeting ends of the rails. In that connection, it has been observed that when the head section of insulation under the rail heads at or adjacent the meeting ends of the rails wears out, the head portion of the insulating end post usually has also worn out. Therefore, it is the main object of the proposed improvement to provide a renewable unit of insulation which includes not only a renewable head section for the joint bar, but also a renewable end post head section.

Consequently, the present invention provides for renewing a part of the insulating end post at the time of renewing the worn-out portions of the joint bar insulation at or adjacent the meeting ends of the rails in the joint.

Furthermore, another object of the invention is to provide a renewable insulation unit which may be readily removed and replaced without taking apart the entire rail joint, it only being necessary to loosen the joint bolts, without removing them, to effect the replacement, thus effecting a great saving in time. This is of practical importance since the joints that wear out their insulation most frequently are generally installed in busy track which allows very limited time for maintenance purposes and repairs.

With these and other objects in view which will more readily appear as the nature of the invention is better understood, the same consists in the novel construction, combination and arrangement of parts hereinafter more fully described, illustrated and claimed.

The essential features of the combinations claimed herein are necessarily susceptible of change without departing from the invention, but a preferred and practical embodiment is shown in the accompanying drawings, in which, Figure 1 is a side elevation of the rail joint with the joint bar removed exposing an insulation unit embodying the present invention.

Figure 2 is a detail perspective of the improved insulation unit shown in Figure 1.

Figure 3 is a detail view similar to Figure 1 illustrating a modification of the invention wherein metal protector plates are interposed between the insulation and the rails.

Like references designate corresponding parts throughout the several figures of the drawings.

The renewable insulation unit contemplated by the present invention primarily includes a joint bar head section of insulation designated by the numeral 1 and an end post head section of insulation designated by the numeral 2. These sections of insulation are formed of hard fiber or other insulation material suitable for the purpose, and are designed to be associated with the conventional or other joint insulation 3, which is not subjected to very great wear and remains in service for a much greater period of time than the insulation at and adjacent the meeting ends of the rails in the joint.

In the embodiment of the invention shown in Figures 1 and 2 of the drawings each bar head section 1 of insulation preferably consists of a short length of fiber of a curved formation so as to fit the head of the joint bar at the central part of the joint. Also in this form of the invention the end post head section 2 of insulation may be formed integrally with or otherwise made a rigid part of the bar head section at one end thereof, and projecting laterally from the latter so as to fit into the space between the meeting ends of the rails to surmount and constitute the head of the body portion 4 of the insulating end post lying between the ends of the rails.

It will be noted that the form of construction shown in Figures 1 and 2 involves the employment of a pair of units at each side of the joint, and the units of each pair are arranged in longitudianl and matching alinement with the head sections 2 of the end post registering so as together to form a substantial head for the insulating end post. At the same time such a construction provides for easy replacement requiring only a loosening of the joint bolts in the joint bars, so as to permit the worn unit to be lifted out and a new unit inserted in place.

Where the insulation is applied to a joint on worn rails or rails that have been cut, which would therefore leave rough edges to quickly wear out the insulation, it is preferable to place metal protector plates 5 between the insulation sections and the adjacent rail surfaces. This is shown in Figure 3 of the drawings in connection with the form of insulation unit shown in Figure 1.

Other modifications will be apparent to those skilled in the art and it will be understood that various changes in the form, proportion and minor details of construction may be resorted to without departing from the spirit or sacrificing any of the advantages of the invention.

I claim:

1. A renewable center insulation for rail joints comprising a pair of separate duplicate matching registering units of insulation each including a bar head section and end post section.

2. A renewable center insulation for rail joints comprising a pair of separate matching units of insulation, each unit consisting of a section to engage the bar head and an inturned section to form a part of the insulating end post.

3. A renewable center insulation for rail joints comprising a pair of separate independently removable and replaceable registering units of insulation, each of said units consisting of a section to engage the bar head and an inturned section forming a part of the end post and flatly abutting the corresponding section of the other unit.

4. An insulated rail joint including in combination with the rails, relatively permanent insulation between the joint bars and the rail heads and between the rail ends, and a renewable central unit of insulation including replaceable bar head sections and a replaceable end post head section.

5. An insulated rail joint including in combination with the rails, relatively permanent insulation between the joint bars and the rail heads and between the rail ends, replaceable bar head sections disposed between the relatively permanent head insulation for the bars, and a replaceable end post head section disposed between the rail ends.

6. An insulating unit for rail joints consisting of a section of insulation formed to fit the head of the joint bar and provided with a section of an end post adapted to fit between the meeting ends of the rails.

In testimony whereof I hereunto affix my signature in the presence of two witnesses.

CLARKSON A. DISBROW.

Witnesses:
E. K. KERSHNER,
KATHERINE MCNALLY.